(12) United States Patent
Zhang et al.

(10) Patent No.: US 11,533,317 B2
(45) Date of Patent: Dec. 20, 2022

(54) SERVERLESS APPLICATION CENTER FOR MULTI-CLOUD DEPLOYMENT OF SERVERLESS APPLICATIONS

(71) Applicant: EMC IP Holding Company LLC, Hopkinton, MA (US)

(72) Inventors: Ruixue Zhang, Shanghai (CN); Jaumir Valença da Silveira Junior, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 361 days.

(21) Appl. No.: 16/587,716

(22) Filed: Sep. 30, 2019

(65) Prior Publication Data

US 2021/0099459 A1    Apr. 1, 2021

(51) Int. Cl.
*H04L 9/40*    (2022.01)
*G06F 8/77*    (2018.01)
*G06F 8/60*    (2018.01)

(52) U.S. Cl.
CPC .............. *H04L 63/105* (2013.01); *G06F 8/60* (2013.01); *G06F 8/77* (2013.01); *H04L 63/08* (2013.01)

(58) Field of Classification Search
CPC ..... H04L 63/105; H04L 63/08; H04L 63/104; G06F 8/60; G06F 8/77
See application file for complete search history.

(56) References Cited

U.S. PATENT DOCUMENTS

| | | | |
|---|---|---|---|
| 8,417,938 | B1 | 4/2013 | Considine et al. |
| 9,229,771 | B2 | 1/2016 | Armour et al. |
| 9,448,791 | B1 * | 9/2016 | McFarlane ................ G06F 8/71 |
| 9,483,259 | B1 * | 11/2016 | Lee ............................ G06F 8/71 |
| 9,608,931 | B2 | 3/2017 | Sharma et al. |
| 9,621,677 | B1 * | 4/2017 | Bradley .................. G06F 21/00 |
| 9,648,134 | B2 | 5/2017 | Frank et al. |
| 9,692,632 | B2 | 6/2017 | Bhattacharya et al. |
| 9,866,433 | B1 * | 1/2018 | Fakhouri ................. H04L 67/10 |
| 9,871,851 | B2 | 1/2018 | Todd et al. |
| 10,129,177 | B2 | 11/2018 | Chang et al. |

(Continued)

OTHER PUBLICATIONS https://docs.microsoft.com/en-us/azure/azure-functions/.

(Continued)

*Primary Examiner* — Aravind K Moorthy
(74) *Attorney, Agent, or Firm* — Ryan, Mason & Lewis, LLP

(57) ABSTRACT

A serverless application center is provided for multi-cloud deployment of serverless applications. One method comprises providing source code, obtained from a first user acting in a developer role, for a multi-cloud serverless application in a serverless application repository; deploying, in response to a request from a second user acting in an end user role, source code for the multi-cloud serverless application from the serverless application repository to one or more clouds in plurality of distinct cloud environments based on the request; and implementing role-based access for users acting in said developer role and said end user role. A user interface can allow the second user to (i) review a published list of serverless applications available in the serverless application repository; and/or (ii) search a plurality of serverless applications available in the serverless application repository.

20 Claims, 8 Drawing Sheets

(56) References Cited

U.S. PATENT DOCUMENTS

| | | | |
|---|---|---|---|
| 10,198,250 B1 | 2/2019 | Sharma et al. | |
| 10,198,447 B2 | 2/2019 | Goswami et al. | |
| 10,379,910 B2 | 8/2019 | Balasubramanian et al. | |
| 10,467,435 B1* | 11/2019 | Ding | G06F 8/60 |
| 10,515,005 B1* | 12/2019 | Burrell | G06F 11/368 |
| 10,540,452 B1* | 1/2020 | Andrews | G06F 40/47 |
| 10,560,345 B2 | 2/2020 | Patel et al. | |
| 10,592,391 B1* | 3/2020 | Anderson | G06F 11/3604 |
| 10,635,642 B1* | 4/2020 | Haggerty | H04L 67/06 |
| 10,642,715 B1* | 5/2020 | Simca | G06F 11/3612 |
| 10,915,303 B2* | 2/2021 | Back | G06F 8/34 |
| 10,983,901 B1* | 4/2021 | Pearce | G06F 11/3476 |
| 11,288,100 B2* | 3/2022 | Ganteaume | G10L 15/22 |
| 11,294,588 B1* | 4/2022 | Miller | G06F 3/0644 |
| 11,403,154 B1* | 8/2022 | Agarwal | G06F 9/544 |
| 2008/0225860 A1* | 9/2008 | Manion | H04L 45/56 370/395.31 |
| 2012/0131553 A1* | 5/2012 | Tsai | G06F 8/71 717/122 |
| 2012/0324417 A1* | 12/2012 | Somani | G06F 9/44 717/101 |
| 2013/0159365 A1* | 6/2013 | Boctor | G06F 16/116 707/827 |
| 2013/0212553 A1 | 8/2013 | Balasubramanian et al. | |
| 2014/0156813 A1 | 6/2014 | Zheng et al. | |
| 2014/0282456 A1 | 9/2014 | Drost et al. | |
| 2015/0263894 A1 | 9/2015 | Kasturi et al. | |
| 2015/0301810 A1* | 10/2015 | Sun | G06F 16/22 717/148 |
| 2016/0021186 A1* | 1/2016 | de Sene | H04L 67/1097 709/213 |
| 2016/0125185 A1* | 5/2016 | Wang | G06F 8/71 726/23 |
| 2016/0132310 A1* | 5/2016 | Koushik | G06F 8/61 717/176 |
| 2016/0226874 A1* | 8/2016 | Wiest | H04L 63/0884 |
| 2017/0003960 A1* | 1/2017 | Subramanian | G06F 8/76 |
| 2017/0103192 A1* | 4/2017 | Hussey | G06F 12/1408 |
| 2017/0111241 A1* | 4/2017 | Degioanni | H04L 41/5009 |
| 2017/0147471 A1* | 5/2017 | Shadi | G06F 11/3624 |
| 2017/0149687 A1* | 5/2017 | Udupi | H04L 47/78 |
| 2017/0169228 A1* | 6/2017 | Brucker | G06F 21/577 |
| 2017/0201569 A1 | 7/2017 | Fu et al. | |
| 2017/0244593 A1 | 8/2017 | Rangasamy et al. | |
| 2017/0257432 A1 | 9/2017 | Fu et al. | |
| 2017/0339065 A1* | 11/2017 | Li | H04L 43/0817 |
| 2017/0351506 A1* | 12/2017 | Celikyilmaz | G06F 8/65 |
| 2018/0025276 A1* | 1/2018 | Hill | G06Q 10/00 706/11 |
| 2018/0081740 A1 | 3/2018 | Syed et al. | |
| 2018/0101372 A1* | 4/2018 | Fransazov | G06F 8/61 |
| 2018/0103064 A1 | 4/2018 | Ahuja et al. | |
| 2018/0157478 A1* | 6/2018 | Wong | H04L 67/02 |
| 2018/0196655 A1 | 7/2018 | Kapoor et al. | |
| 2018/0203792 A1* | 7/2018 | Ekambaram | G06F 11/3688 |
| 2018/0204407 A1* | 7/2018 | Salemon | G07C 9/00896 |
| 2018/0241642 A1 | 8/2018 | Patel et al. | |
| 2018/0260301 A1 | 9/2018 | Podjamy et al. | |
| 2018/0270122 A1 | 9/2018 | Brown et al. | |
| 2018/0285353 A1 | 10/2018 | Ramohalli Gopala Rao et al. | |
| 2018/0300173 A1* | 10/2018 | Shimamura | G06F 9/5066 |
| 2018/0302335 A1 | 10/2018 | Gao et al. | |
| 2018/0316552 A1* | 11/2018 | Subramani Nadar | G06F 8/65 |
| 2018/0324119 A1 | 11/2018 | Ahuja et al. | |
| 2018/0324204 A1 | 11/2018 | McClory et al. | |
| 2018/0373516 A1* | 12/2018 | Gopal | G06F 8/443 |
| 2019/0007458 A1* | 1/2019 | Shulman | H04L 63/1433 |
| 2019/0018715 A1* | 1/2019 | Behrendt | G06F 9/542 |
| 2019/0034181 A1 | 1/2019 | Kapoor et al. | |
| 2019/0213115 A1* | 7/2019 | Takawale | G06N 5/046 |
| 2019/0220292 A1* | 7/2019 | Chen | G06F 9/4881 |
| 2019/0235850 A1* | 8/2019 | Mukherjee | G06F 8/65 |
| 2019/0235852 A1 | 8/2019 | Bartolotta et al. | |
| 2019/0278589 A1* | 9/2019 | Cook | H04L 63/08 |
| 2019/0303018 A1* | 10/2019 | Huang | G06F 3/067 |
| 2019/0305957 A1* | 10/2019 | Reddy | H04L 63/123 |
| 2019/0306236 A1 | 10/2019 | Wiener et al. | |
| 2019/0312899 A1* | 10/2019 | Shulman | H04L 63/1416 |
| 2019/0373056 A1* | 12/2019 | Kalach | H04L 67/1095 |
| 2019/0377556 A1* | 12/2019 | Mishra | G06F 11/3466 |
| 2019/0384655 A1* | 12/2019 | Krishna Singuru | G06F 9/542 |
| 2020/0004591 A1* | 1/2020 | Das | H04L 63/083 |
| 2020/0012582 A1* | 1/2020 | Sharma | G06F 11/3664 |
| 2020/0026511 A1* | 1/2020 | Swierc | G06F 8/71 |
| 2020/0026850 A1* | 1/2020 | Levin | H04L 63/1408 |
| 2020/0034192 A1 | 1/2020 | Kandula et al. | |
| 2020/0036785 A1 | 1/2020 | Kandula et al. | |
| 2020/0053091 A1* | 2/2020 | Childress | G06F 9/451 |
| 2020/0073783 A1* | 3/2020 | Hortala | G06F 9/54 |
| 2020/0089515 A1 | 3/2020 | Hari | |
| 2020/0104236 A1* | 4/2020 | Creel | G06F 16/2365 |
| 2020/0104532 A1* | 4/2020 | Anderson | G06F 16/13 |
| 2020/0133738 A1 | 4/2020 | Junior et al. | |
| 2020/0174907 A1* | 6/2020 | Lundquist | G06F 11/3604 |
| 2020/0204618 A1* | 6/2020 | Agarwal | H04L 9/0643 |
| 2020/0210218 A1 | 7/2020 | Lu et al. | |
| 2020/0213357 A1* | 7/2020 | Levin | H04L 41/0836 |
| 2020/0218514 A1* | 7/2020 | Wang | G06F 16/2246 |
| 2020/0218533 A1* | 7/2020 | Sharma | G06F 11/3664 |
| 2020/0244772 A1 | 7/2020 | Luo et al. | |
| 2020/0257567 A1 | 8/2020 | Filho et al. | |
| 2020/0264919 A1* | 8/2020 | Vukovic | G06K 9/00536 |
| 2020/0272556 A1 | 8/2020 | Podjamy et al. | |
| 2020/0274758 A1* | 8/2020 | Sudhakaran | H04L 67/10 |
| 2020/0314168 A1* | 10/2020 | Nauerz | H04L 67/10 |
| 2020/0382591 A1 | 12/2020 | Becker | |
| 2020/0410448 A1* | 12/2020 | Gadge | G06F 40/30 |
| 2020/0412538 A1* | 12/2020 | Rosado | H04L 9/3247 |
| 2020/0412720 A1* | 12/2020 | Siefker | H04L 41/0895 |
| 2021/0011712 A1* | 1/2021 | Grant | G06F 11/3616 |
| 2021/0056210 A1* | 2/2021 | Iyer | G06F 21/57 |
| 2021/0067324 A1* | 3/2021 | Valente | H04L 9/088 |
| 2021/0099459 A1 | 4/2021 | Zhang et al. | |
| 2021/0109775 A1* | 4/2021 | Shen | G06F 9/545 |
| 2021/0110506 A1* | 4/2021 | Prakash | G06F 9/45533 |
| 2021/0117417 A1* | 4/2021 | Hendrickson | G06F 16/2465 |
| 2021/0132915 A1* | 5/2021 | Ivankovic | G06N 5/04 |
| 2021/0144013 A1* | 5/2021 | Chen | G06F 9/45558 |
| 2021/0263779 A1* | 8/2021 | Haghighat | G06F 11/3419 |

OTHER PUBLICATIONS https://cloud.google.com/functions/.
https://en.wikipedia.org/wiki/Continuous_integration.
https://en.wikipedia.org/wiki/Continuous_deployment.
https://cloud.google.com/functions/docs/writing/http.
https://docs.microsoft.com/en-us/azure/azure-functions/functions-bindings-http-webhook.
https://searchvmware.techtarget.com/definition/VMware-VirtualCenter.
https://www.ibm.com/support/knowledgecenter/en/SSBS6K_3.1.0/mcm/getting_started/introduction.html.
https://kubernetes.io.
https://en.wikipedia.org/wiki/Infrastructure_as_a_service.
https://en.wikipedia.org/wiki/URL_redirection.
https://en.wikipedia.org/wiki/Google_Storage.
https://en.wikipedia.org/wiki/Microsoft_Azure#Storage_services.
https://en.wikipedia.org/wiki/Class_(computer_programming)#Abstract_and_concrete.
https://docs.microsoft.com/en-us/dotnet/csharp/programming-guide/delegates/.
https://docs.microsoft.com/en-us/rest/api/billing.
https://cloud.google.com/billing/reference/rest/.
https://en.wikipedia.org/wiki/Syntax_(programming_languages).
https://en.wikipedia.org/wiki/Regular_expression.
https://en.wikipedia.org/wiki/Source-to-source_compiler.
https://en.wikipedia.org/wiki/GitHub.
https://en.wikipedia.org/wiki/Create,_read,_update_and_delete.
https://www.icann.org/.
https://developer.mozilla.org/en-US/docs/Glossary/Signature/Function.

(56) References Cited

OTHER PUBLICATIONS https://developer.mozilla.org/en-US/docs/Learn/JavaScript/Building_blocks/Return_values.
https://vmware.my.salesforce.com/apex/page?name=vrealizesuite.
"Microservices", downloaded from https://en.wikipedia.org/wiki/Microservices on Oct. 25, 2018.
"Application programming interface", downloaded from https://en.wikipedia.org/wiki/Application_programming_interface an Oct. 25, 2018.
Junod, Betty, "Container as a Service (CaaS) as your New Platform for Application Development and Operations" downloaded from CaaS: https://blog.docker.com/2016/02/containers-as-a-service-caas/ on Oct. 25, 2018.
"Function as a Service", downloaded from https://en.wikipedia.org/wiki/Function_as_a_service on Oct. 25, 2018.
"Microsoft Azure", downloaded from https://en.wikipedia.org/wiki/Microsoft_Azure on Oct. 25, 2018.
"Google Cloud Platform", downloaded from https://en.wikipedia.org/wiki/Google_Cloud_Platform on Oct. 25, 2018.
"Pivotal Web Services", downloaded from https://run.pivotal.io/ on Oct. 25, 2018.
"Unified Cloud Management", downloaded from https://www.unigma.com/, onOct. 25, 2018.
"RightScale Cloud Management", downloaded from https://www.rightscale.com/, on Oct. 25, 2018.
"Cloud Cruiser: Cloud Cost Management—Cloud Spending", https://www.cloudcruiser.com/, on Oct. 25, 2018.
"Object-oriented-programming", downloaded from https://en.wikipedia.org/wiki/Object-oriented-programming on Oct. 25, 2018.
"Cron", downloaded from https://en.wikipedia.org/wiki/Cron on Oct. 25, 2018.
Josef Spillner; "Quantitative Analysis of Cloud Function Evolution in the AWS Serverless Application Repository"; Zurich University of Applied Sciences, Service Prototyping Lab, Switzerland—May 14, 2019.
DiNitto et al., "Model-Driven Development and Operation of Multi-Cloud Applications, The MODA Clouds Approach" https://www.modaclouds.eu/, downloaded Oct. 19, 2018.
https://en.wikipedia.org/wiki/Function_as_a_service, downloaded Aug. 14, 2019.
https://www.unigma.com/, downloaded Aug. 15, 2019.
https://www.rightscale.com/, downloaded Aug. 15, 2019.
https://www.cloudcruiser.com/, downloaded Aug. 15, 2019.
https://en.wikipedia.org/wiki/Object-oriented_programming, downloaded Aug. 15, 2019.
https://dell.anaqua.com/anaqua/Survey/Survey.aspx?SurveyAnswerGroupId=81479124.
https://docs.microsoft.com/en-us/azure/active-directory/.
U.S. Appl. No. 16/171,554 entitled, "Multi-Cloud Framework for Microservice-Based Applications", filed 1026/2018.
U.S. Appl. No. 16/554,903 entitled, "Multi-Cloud Operations Center for Function-Based Applications", filed Aug. 29, 2019.
Vmware, Introduction to vRealize Suite, available at https://docs.vmware.com/en/vRealize-Suite/2018/com.vmware.vrealizesuite.overview.doc/GUID-E35A076A-D12B-4477-BE11-9E35E9389ACA.html, last updated on May 31, 2019.

* cited by examiner

```
{"AppRegistration": {
    "Client id": "123456",
    "AppName": "SuperApp",
    "LanguageRuntime": "nodejs8",
    "Origin Path: "https://github.fake.dell.com/fake/MyApplication.git"
    "Function": [
        {"Name": "SuperFunc1", "Type": "Http", "Params":" "},
        {"Name": "SuperFunc2", "Type": "Timer", "Params":"*/5 * * * "},
        {"Name": "SuperFunc3", "Type": "Storage", Params: "connection Params"}
    ]
}}
```

SERVERLESS APPLICATION CENTER FOR MULTI-CLOUD DEPLOYMENT OF SERVERLESS APPLICATIONS

FIELD

The field relates generally to information processing, and more particularly, to the deployment of software applications in a multi-cloud environment.

BACKGROUND

Software applications are increasingly deployed as a collection of functions. In addition, a number of software providers are increasingly using multiple cloud environments to host their applications and/or data. A need remains for improved techniques for deploying serverless applications across multiple cloud environments.

SUMMARY

In one embodiment, a method comprises providing source code, obtained from a first instance of a first user acting in a developer role using a user interface, for at least a portion of a serverless application in a serverless application repository, wherein the serverless application is deployable to one or more clouds of a plurality of distinct cloud environments; deploying, in response to a request from a second user acting in an end user role using a second instance of the user interface, source code for the serverless application from the serverless application repository to one or more of the clouds in plurality of distinct cloud environments based on the request; and implementing role-based access for users acting in said developer role and said end user role.

In some embodiments, the user interface allows the second user to (i) review a published list of serverless applications available in the serverless application repository; and/or (ii) search a plurality of serverless applications available in the serverless application repository. In one or more embodiments, the role-based access comprises a role-based authentication of users acting in said developer role and said end user role.

Other illustrative embodiments include, without limitation, apparatus, systems, methods and computer program products comprising processor-readable storage media.

BRIEF DESCRIPTION OF THE DRAWINGS

FIG. 3 illustrates an exemplary application registration request sent by a developer to the serverless application framework of FIG. 1, according to at least one embodiment;

DETAILED DESCRIPTION

Figure 1:
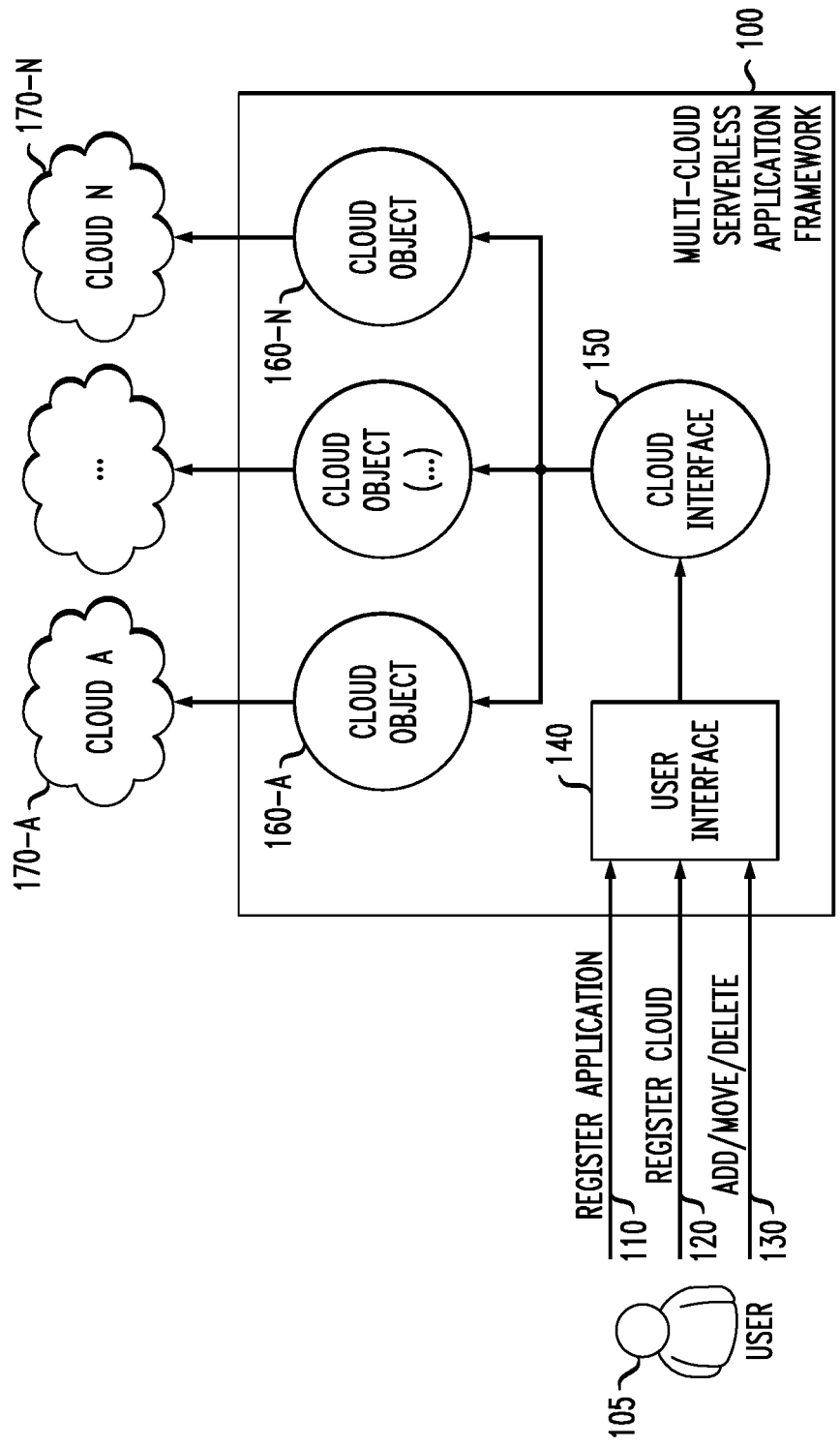
FIG. 1 illustrates an exemplary architecture for a multi-cloud serverless application framework, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide a serverless application center for multi-cloud deployment of serverless applications.

Generally, serverless applications are created by software developers as a composition of code fragments corresponding to individual functions that work together to realize the functionalities of an application. An application of this kind is typically deployed in a cloud that offers a Function-as-a-Service (FaaS) environment, such as Azure Functions from Microsoft Corp., or Google Cloud Functions from Google Inc.

U.S. patent application Ser. No. 16/171,554, filed Oct. 26, 2018 (now U.S. Pat. No. 11,385,940), entitled "Multi-Cloud Framework for Microservice-Based Applications," and U.S. patent application Ser. No. 16/554,903, filed Aug. 29, 2019 (now U.S. Pat. No. 11,055,066), entitled "Operations Center for Function-Based Applications," each incorporated by reference herein in its entirety, describe techniques for deploying microservice-based applications across multiple cloud environments. A software Application Programming Interface (API) is provided in some embodiments that allow a developer to deploy a serverless application to multiple clouds, as well as to migrate functions among clouds, in a manner that he or she could, virtually at any moment, track down which functions of which applications were running on which clouds.

One or more embodiments of the present disclosure provide an end-to-end product, referred to in some embodiments as a serverless application center, that serves as a store for multi-cloud serverless applications. End user customers can deploy serverless applications to various cloud providers using button clicks by means of a user interface without significant technical requirements. The disclosed multi-cloud serverless application center allows serverless applications to be shared and reused by several users.

Consider that a developer has an application written to be deployed according to a modern FaaS paradigm: an application is typically a set of functions that can be run, deployed and tested separately in some Cloud environment. The developer can choose one Public Cloud to deploy his or her application and, once deployed, the cloud provider sends regular bills related to resource consumption.

Service prices offered by cloud providers, however, are often dynamic and can change frequently. Thus, a developer may query whether his or her functions are always running on the most cost-effective cloud. A developer may desire to be able to automatically move functions among clouds with minimal effort (e.g., with little, if any, human intervention and/or with little, if any, need to have multiple account subscriptions for different clouds).

Moreover, if some functions of the application are web services (e.g., services that communicate with remote end users via HTTP) that experience regional traffic congestions, it would be nice to be able to easily move these functions to clouds in other regions, again with little, if any, human intervention.

To address the needs of deploying, optimizing and/or monetizing modern serverless applications in multi-cloud environments, an architecture is disclosed for a multi-cloud operations center (e.g., a software system in some embodiments that runs on a server machine and removes the burden from developers of managing multiple clouds in order to harness the benefits from multi-cloud environments).

System Users

In at least one embodiment, the disclosed system is designed to operate with multiple types of users: an administrator, who is responsible for setting up and maintain the system, developers, and end users that deploy serverless applications to one or more clouds and that effectively create serverless applications to be deployed to public clouds. The responsibilities of the administrator, end users and developers in the disclosed system are discussed further below in the following sections.

Applications created by developers can be any kind of applications supported by Cloud FaaS environments, from one-page websites to complex applications whose functions are distributed among various geographic regions.

Administrator

In one or more embodiments, an administrator is an internal member of the disclosed multi-cloud serverless application center who decides whether an application submitted by developers is qualified to be published into the application center. The administrator has the following responsibilities. In some embodiments, administrators act as a broker for developers, by creating subscriptions (e.g., accounts) for each Cloud that takes part in the multi-cloud environment (e.g., Azure and/or GCP (Google Cloud Platform)). The disclosed system will use these accounts to deploy, update and/or delete functions created by developers to the clouds, so the developers in some embodiments will not need to create any cloud subscriptions themselves;

setting up the disclosed system in a server machine and maintaining its operation;

maintaining a list of registered DNS (Domain Name System) domains and a table of domain redirections within a global DNS (this mechanism of domain redirection will allow for seamless migration of HTTP-based functions among clouds, allowing end users to work with fixed URLs, as discussed further below).

Developers

In some embodiments, developers are customers who develop serverless applications and submit their serverless applications into our application center. There are technical requirements for developers, because they are responsible for developing serverless applications. Developers may want their applications published to several clouds without the burden of registering with various clouds and dealing with them, nor do developers typically want to deal with several billing statements. Developer interactions with the disclosed system in some embodiments include, for example:

create and/or delete a unique user account in the system, providing personal and billing information;

register and/or de-register applications, providing the address of a source code repository for each application;

initiate application deployment and activate/deactivate CI/CD; and receive notifications about application usage and bills related to it.

End Users

End users are customers who make use of multi-cloud applications published by developers. In some embodiments, there are no technical requirements for end users. End users can use the disclosed multi-cloud serverless application center to deploy multi-cloud serverless applications by several button clicks from the disclosed user interface. End users can employ a user interface of the disclosed serverless application center to (i) review a published list of serverless applications available in the serverless application repository; and/or (ii) search a plurality of serverless applications available in the serverless application repository. In response to a request from an end user of a plurality of end users acting in an end user role using the user interface, source code for the serverless application is deployed from a serverless application repository to one or more of the clouds in plurality of distinct cloud environments based on the request.

One or more embodiments of the disclosure provide an end-to-end software system that allows developers that work with FaaS technologies to take advantage of a multi-cloud environment.

FIG. 1 illustrates an exemplary architecture for a multi-cloud serverless application framework 100, according to an embodiment of the disclosure. As shown in FIG. 1, the exemplary multi-cloud serverless application framework 100 processes requests from a user 105 via a user interface 140, such as requests to register an application 110, requests to register a cloud 120; and/or requests to add, move and/or delete an application 130.

In the example of FIG. 1, the exemplary multi-cloud serverless application framework 100 is comprised of a cloud interface 150, and a plurality of cloud objects 160-A through 160-N for accessing clouds A through N 170-A through 170-N, respectively, such as clouds from AWS, GCP and/or Microsoft Azure.

In one or more embodiments, the exemplary multi-cloud serverless application framework 100 demonstrates the following exemplary functionality: Users 105 communicate with the user interface 140, informing what actions they would like to take, including:

register applications 110: users 105 should provide information such as application name and source code repository;

register clouds 120: users 105 should provide cloud account information; and add/move/delete functions 130: users 105 can add functions of an application into a specific cloud, move functions between different clouds, and/or delete functions of an application from a specific cloud.

In addition, after receiving requests from users 105, the user interface 140 will connect with a specific cloud object 160 that implements a common cloud interface, and notify the cloud 170 to take actions according to the requests from the user 105. Further, a specific cloud object 160 will finally interact with the corresponding cloud provider, add functions into a given cloud, move functions between clouds, and/or delete functions from clouds.

With the exemplary framework of FIG. 1, users 105 can deploy multi-cloud serverless applications.

Figure 2:
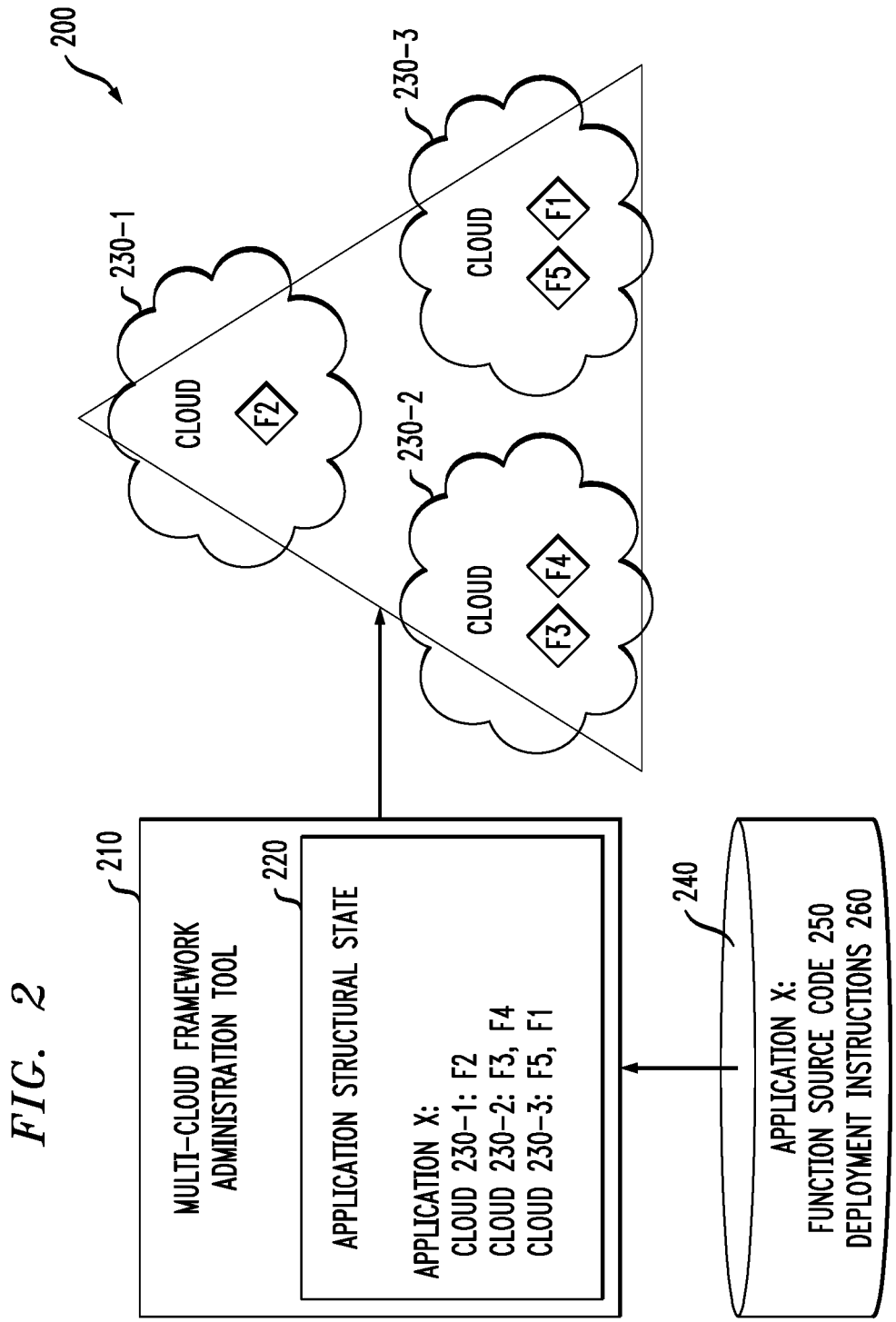
FIG. 2 illustrates an exemplary multi-cloud application environment where a serverless application is deployed, according to one embodiment of the disclosure.

FIG. 2 illustrates an exemplary multi-cloud application environment 200, according to one embodiment of the disclosure. As shown in FIG. 2, the exemplary multi-cloud application environment 200 comprises a multi-cloud framework administration tool 210 that maintains a structural state 220 for one or more applications, such as an application X. Application X comprises five functions, F1, F2, F3, F4 and F5 that run in three different cloud environments 230-1 through 230-3. In one or more embodiments, the application structural state 220 comprises an indication of the cloud environment 230-1 through 230-3 that hosts each function F1 through F5 of the application X, at a given point in time.

Thus, in the example of FIG. 2, cloud environment 230-1 hosts function F2, cloud environment 230-2 hosts functions F3 and F4, and cloud environment 230-3 hosts functions F5 and F1.

In one or more embodiments, the multi-cloud framework administration tool 210 keeps the application structural state 220 up-to-date, as new functions are created or deleted on different cloud environments 230.

The disclosed multi-cloud framework allows for the use of multiple function types. In this manner, a user can initially decide to execute one or more functions in a cloud environment 230 using a first function type and then decide to migrate the one or more functions to another cloud environment 230 using a different function type, as discussed further below. Some exemplary function types are discussed further below in conjunction with FIG. 3.

It is noted that the disclosed multi-cloud framework is optionally extensible and allows for the registering of other function types, as would be apparent to a person of ordinary skill in the art.

As shown in FIG. 2, the exemplary multi-cloud framework administration tool 210 accesses a data store such as a local or global repository 240 comprising a source code 250 for the plurality of functions of the application and deployment instructions (e.g. configuration files, if applicable) 260 for each of the plurality of distinct cloud environments 230-1 through 230-3. Generally, as discussed further below, the exemplary multi-cloud framework administration tool 210 deploys the plurality of functions F1 through F5 of the application X using the structural state 220 of the application, the source code 250 for the plurality of functions F1 through F5 and the deployment instructions (e.g. configuration files, if applicable) 260 for each of the plurality of distinct cloud environments 230.

In various embodiments, the local or global repository 240 could be any kind of structured data repository, ranging from a folder structure in the operating system file system to a full-fledged commercial Database Management System, depending on organizational concerns such as Information Technology infrastructure norms or security policies. It is important to notice, however, that for multi-cloud CI/CD (continuous integration/continuous delivery) to be in place, the application repository must be able to send notifications when the source code for functions registered in the system is modified.

Large companies that are already migrating or intend to migrate applications to the cloud are starting to look at multi-cloud environments as a means of budget savings and avoidance of vendor lock-in. Public clouds offer various services at different prices, and it would be desirable to use different clouds wisely, based on their price offers. At the same time, current industry trends in Cloud Computing point strongly to serverless computing, and cloud providers already provide serverless solutions, e.g., Azure Functions and/or Google Cloud Functions.

There is currently no product in the market, however, that can combine both approaches. In one or more embodiments, the disclosed multi-cloud techniques view applications as a composition of functions to be deployed in serverless cloud environments, and at the same time the functions can be easily migrated from one cloud to another, and this migration is based on cost (or other criteria defined by the users) of the functions.

U.S. patent application Ser. No. 16/171,554 (now U.S. Pat. No. 11,385,940), and U.S. patent application Ser. No. 16/554,903 (now U.S. Pat. No. 11,005,066), each referenced above, provided a step towards this multi-cloud serverless scenario, by providing an architecture that allows for deployment of serverless applications in multiple clouds and migration of functions among clouds. The present disclosure extends these teachings to provide an end-to-end scenario where this architecture can be fully utilized in the multi-cloud serverless application framework 100 of FIG. 1, with visible benefits for developers and other users that employ it.

In one or more embodiments, a software architecture is provided to implement a serverless application center for multi-cloud deployment of serverless applications. Among other benefits, one or more new features are provided for multi-cloud environments, such as role-based access for users acting in a developer role and/or an end user role. Developers can source code using a user interface, for a serverless application that will be maintained in a serverless application repository. In addition, in response to a request from an end user using the user interface, source code for the serverless application is deployed from the serverless application repository to one or more of the clouds in plurality of distinct cloud environments based on the request.

FIG. 3 illustrates an exemplary application registration request 300 sent by a developer to the multi-cloud serverless application framework 100 of FIG. 1, according to at least one embodiment. As shown in FIG. 3, an exemplary application registration request sent by a developer comprises the following representative information:

- developer identifier (granted during Developer User Account Creation);
- application name;
- application language/runtime (e.g., Jnode6, Python 3.5, etc.);
- URL for the application source code; and
- list comprising name and type of each function and specific information about functions, if needed.

The user specified in the application registration request 300 is validated and the specified application name is evaluated to ensure that it does not yet exist. The functions list can then be passed to a cloud transpiler, so that the cloud transpiler can generate configuration code for different cloud types available in the system (e.g., Azure, GCP) and for different supported function types. Examples of function types can be:

- HTTP-triggered functions, that respond to HTTP requests;
- time-triggered functions, that must execute at a predefined time schedule; and
- storage-triggered functions, that must execute when some public cloud storage detects new data.

Figure 4:
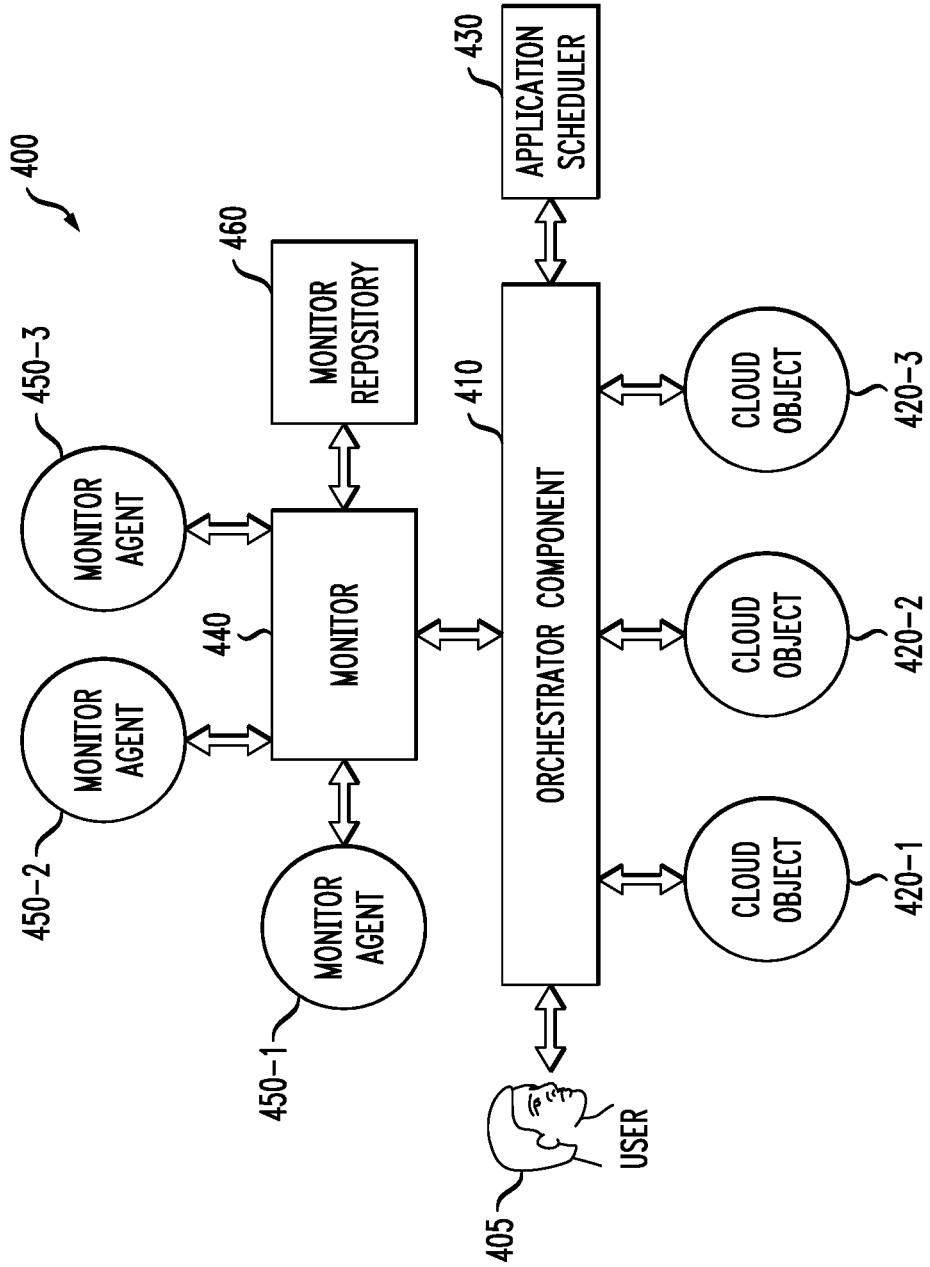
FIG. 4 illustrates an exemplary logical architecture for a multi-cloud orchestrator component of the framework, according to an embodiment.

FIG. 4 illustrates an exemplary logical architecture 400 for the disclosed multi-cloud framework, according to an embodiment. As shown in FIG. 4, the exemplary logical architecture 400 comprises a multi-cloud (MC) orchestrator component 410, an application scheduler 430 and a monitor 440.

The MC orchestrator component 410 is the main coordinator of the multi-cloud application environment 200 of FIG. 2. The MC orchestrator component 410 allows a user 405 to interact with the disclosed multi-cloud framework via standard operations so that the multi-cloud framework can provide three exemplary functionalities:

orchestration—keeping the coherence of the application among clouds 230, allowing for deployment, removal or relocation of functions;

resource monitoring—the MC orchestrator component 410 communicates with the monitor 440, which in turn communicates with monitor agents 450-1 through 450-3 for different clouds, so as to collect user-defined metric values; and application scheduling—the MC orchestrator component 410 communicates with the application scheduler 430 so the application scheduler 430 can use data collected by the monitor 440 to calculate and suggest a move plan back to the MC orchestrator component 410.

One MC orchestrator component 410 can reside on a local desktop and will allow the cloud administrator to manage the multi-cloud application environment 200 of FIG. 2, with help of the other cloud objects depicted in FIG. 4.

In one or more embodiments the MC orchestrator component 410 stores a dictionary containing the structural state 220 of each application:
  app_name
  -Dict<Cloud,        Dict<Service,(active_version, List<Version>)>>

Each time a user calls an operation that is supposed to be performed on an application, the MC orchestrator component 410 uses this dictionary to know which clouds host which functions of that application, and in turn the MC orchestrator component 410 calls the cloud-specific objects to carry on operations specific to the services that each cloud hosts.

The MC orchestrator component 410 object also keeps the URL for the monitor 440 and the application scheduler 430, so the MC orchestrator component 410 can ask these two objects to execute operations related to monitoring and application scheduling. The monitor 440 and the application scheduler 430 reside in principle in the same device as the MC orchestrator component 410, but they can also reside on any cloud, as an alternative implementation, as would be apparent to a person of ordinary skill in the art.

Each cloud environment 230 can be classified according to a CloudType and, for each cloud environment 230 that will be part of the multi-cloud application environment 200 of FIG. 2, there is a cloud object 420 running that corresponds to that CloudType. These Cloud objects 420-1 through 420-3 can reside either in their respective Cloud or in the same device as the MC orchestrator component 410—both implementations are possible. The cloud object 420 receives orders from the MC orchestrator component 410 and manages services in the Cloud environment 230 that the cloud object 420 is responsible for.

In one or more embodiments, there are different implementations of cloud objects 420, one for each supported CloudType. The various cloud objects 420 implement substantially the same list of operations in some embodiments (e.g., the same API that the orchestrator uses to communicate with them). The exemplary logical architecture 400 of FIG. 4 allows for the MC orchestrator component 410 to talk to all clouds 230 using a unified interface, and each cloud object 420 will use native cloud APIs (those of either public or on-premises clouds) to carry out the operations.

In a similar manner as cloud objects 420, each cloud (e.g., either public or on-premises clouds) should have a monitor agent 450-1 through 450-3 running either on the respective cloud environment 230 or in the same device as the monitor 440—both implementations are possible. The monitor agent 450 is responsible for monitoring user-defined metrics related to functions that are allocated on one specific cloud and for sending the metrics data to a user-defined repository, which can optionally reside on the same cloud environment 230.

While different cloud objects 420 exist for different CloudTypes, different monitor agents 450 also exist for different CloudTypes, because they use the native-provided APIs to carry out their operations. In one or more embodiments, the different monitor agents 450 implement substantially the same API.

The monitor 440 communicates with the different monitor agents 450 in order to order them to start or stop monitoring functions. The monitor 440 receives monitoring reports from each monitor agent 450 responsible for monitoring cloud environments 230 and aggregates them in reports that are saved to a repository. This repository with aggregated data can be used to send monitoring reports to the MC orchestrator component 410 or the repository can be used by the application scheduler 430 to create move plans.

The monitor 440 keeps information about monitor agents 450, specifically which functions are being monitored by which monitor agents 450 in which cloud environment 230 and which metrics are being monitored for each function.

As shown in FIG. 4, a monitor repository 460 stores all measures sent by different cloud environments 230, and the monitor repository 460 organizes the measures in records with the following exemplary structure:
  Application_name|service_name|Measure.

The application scheduler 430 uses the data accumulated in the monitor repository 460 used by the monitor 440 to analyze the accumulated data and create a move plan. It also allows the users to create Clots. A clot is a list of functions that cannot be moved separately. Either they are moved together or they do not take part in the move plan.

In some embodiments, the application scheduler 430 is a single object which optionally lives on the same site as the monitor repository 460.

While the MC orchestrator component 410, the application scheduler 430 and the monitor 440 are separate components in the exemplary logical architecture 400 of FIG. 4, other implementations are possible, as would be apparent to a person of ordinary skill in the art. Likewise, while the cloud objects 420 and monitor agents 450 are separate components in the exemplary logical architecture 400 of FIG. 4, other implementations are possible, as would be apparent to a person of ordinary skill in the art. The embodiment of FIG. 4 allows for scalability (each logical component being a separate executable code component). Moreover, the framework model can be extended to a model that accommodates multiple monitors 440 and application schedulers 430.

Figure 5:
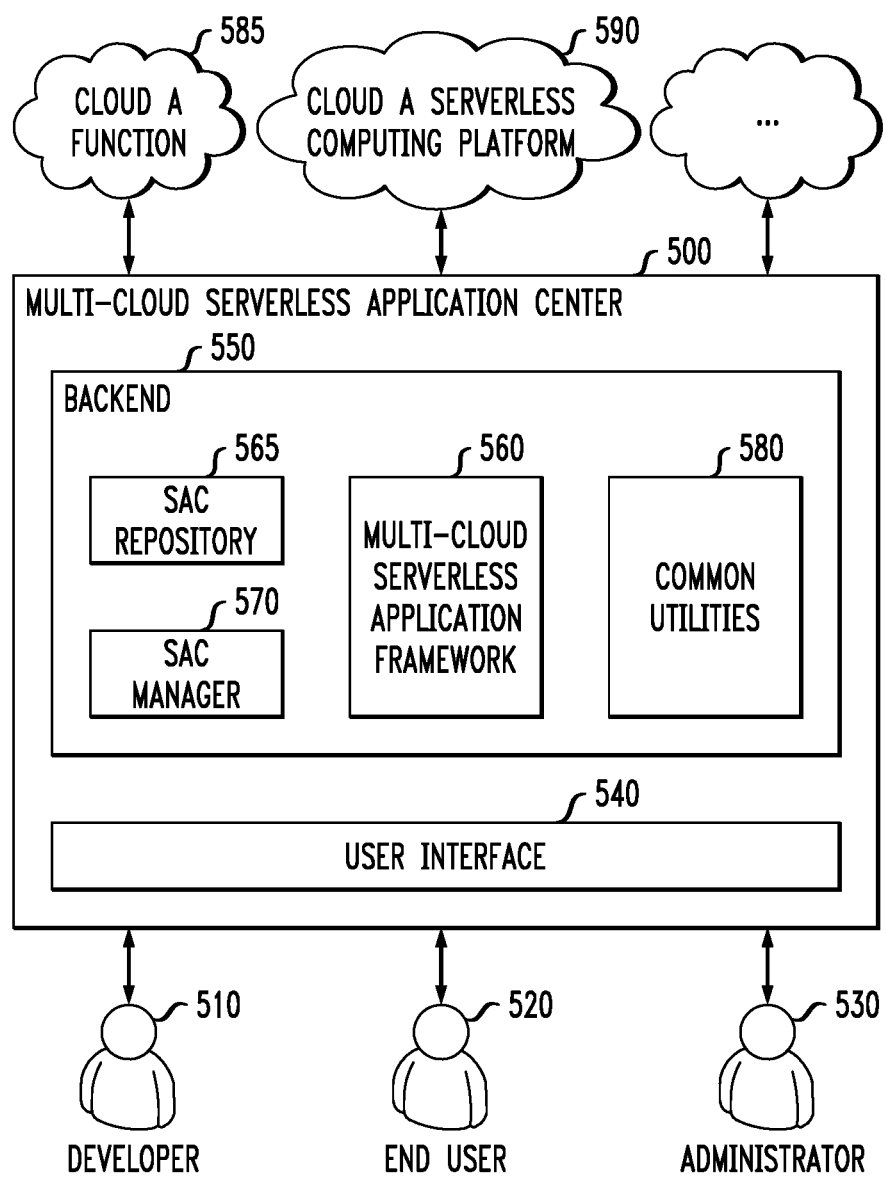
FIG. 5 illustrates an exemplary architecture for a multi-cloud serverless application center, according to at least one embodiment.

FIG. 5 illustrates an exemplary architecture for a multi-cloud serverless application center 500, according to at least one embodiment. As shown in FIG. 5, the exemplary multi-cloud serverless application center 500 receives user requests from one or more of a developer 510, an end user 520, and an administrator 530, that communicate using a user interface 540. In some embodiments, the user interface 540 can be implemented as a web site that optionally employs role-based access control authentication for each role.

The exemplary multi-cloud serverless application center 500 comprises a backend 550 that further comprises a multi-cloud serverless application framework 560, a serverless application code (SAC) repository 565, a SAC manager 570 and one or more common utilities 580. The exemplary multi-cloud serverless application center 500 interacts with one or more functions 585 of a Cloud A, and a serverless computing platform 590 of Cloud A, where Cloud A is of first cloud environment of a plurality of distinct cloud environments.

In some embodiments, the exemplary multi-cloud serverless application framework 560 is implemented using the techniques discussed above in conjunction with FIGS. 1-3.

In one or more embodiments, the SAC repository 565 is a repository used to store serverless application code published by developers 510. In addition, the SAC manager 570 can be implemented as a logic module to manage the SAC repository 565. When developers 510 publish serverless applications into the application center, the SAC manager 570 uploads the source code of the serverless application into the SAC repository 565. When end users 520 deploy applications into a cloud, the SAC manager 570 will obtain the source code of the deployed serverless application from the SAC repository 565 and sends the source code to the multi-cloud serverless application framework 560.

The common utilities 580 may include, for example, a security module, a log module and/or a routing module.

Figure 6:
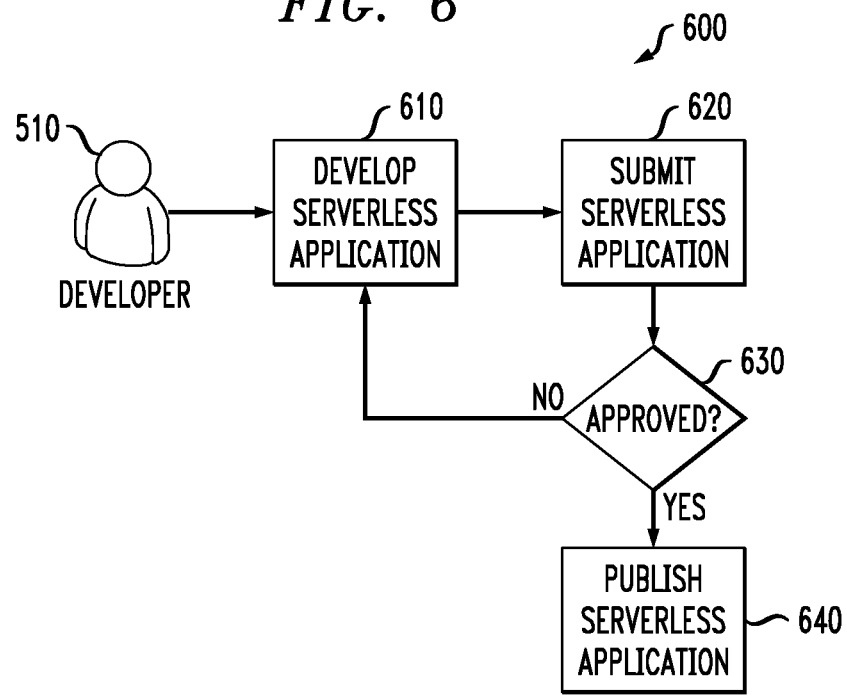
FIG. 6 is a flow chart illustrating an exemplary implementation of a serverless application submission process from the perspective of a developer, according to one embodiment of the disclosure.

FIG. 6 is a flow chart illustrating an exemplary implementation of a serverless application submission process 600 from the perspective of a developer, according to one embodiment of the disclosure. As shown in FIG. 6, in the exemplary serverless application submission process 600 from the perspective of a developer, a developer 510 initially develops a serverless application during step 610, and submits the developed serverless application during step 620.

A test is performed during step 630 to determine if the application is approved. If it is determined during step 630 that the application is not approved, then program control returns to step 610 for the developer 510 to further develop the same or a different serverless application, and submit the serverless application for approval.

If it is determined during step 630 that the application is approved, then program control proceeds to step 640 where the serverless application is published. Thus, developers can publish serverless applications into the disclosed multi-cloud serverless application center. When developers publish the serverless application into the disclosed application center, developers push the code into the SAC repository 565, while the source code is not yet deployed to cloud providers.

When developers employ the serverless application submission process 600 to publish serverless applications into the multi-cloud serverless application center 500, the SAC manager 570 uploads the source code of the serverless application into the SAC repository 565 for each cloud type.

Figure 7:
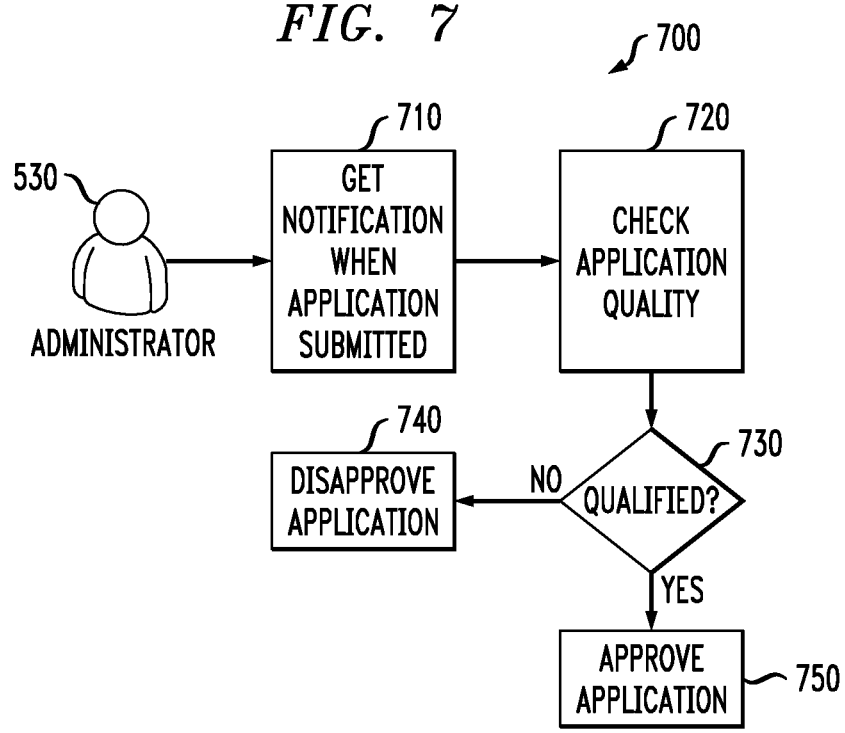
FIG. 7 is a flow chart illustrating an exemplary implementation of a serverless application evaluation process from the perspective of an administrator of the multi-cloud serverless application center of FIG. 5, according to one or more embodiments.

FIG. 7 is a flow chart illustrating an exemplary implementation of a serverless application evaluation process 700 from the perspective of an administrator of the multi-cloud serverless application center of FIG. 5, according to one or more embodiments. As shown in FIG. 7, in the exemplary serverless application evaluation process 700, an administrator 530 receives a notification during step 710 when a serverless application is submitted. Thereafter, the serverless application evaluation process 700 evaluates the application quality during step 720. For example, the serverless application evaluation process 700 can evaluate whether the serverless source code was properly submitted, and whether the submitted code passes one or more of a legal and a compliance check, so as to decide whether to approve the application.

A test is performed during step 730 to determine if the application is qualified. If it is determined during step 730 that the application is not qualified, then the submitted application is disapproved during step 740.

If, however, it is determined during step 730 that the application is qualified, then the submitted application is approved during step 750.

Figure 8:
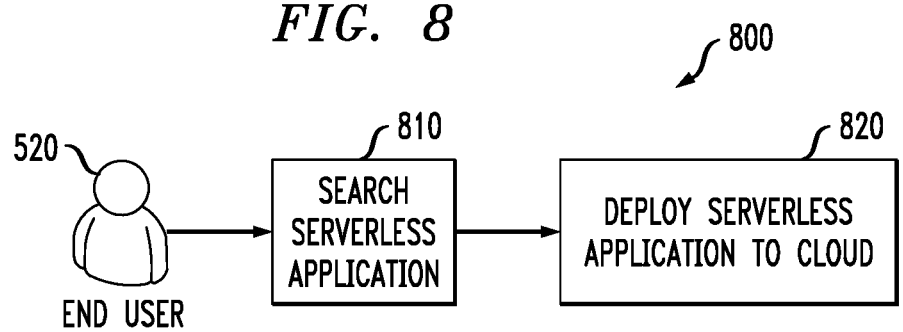
FIG. 8 is a flow chart illustrating an exemplary implementation of a serverless application deployment process from the perspective of an end user of the multi-cloud serverless application center of FIG. 5, according to at least one embodiment of the disclosure.

FIG. 8 is a flow chart illustrating an exemplary implementation of a serverless application deployment process 800 from the perspective of an end user of the multi-cloud serverless application center of FIG. 5, according to at least one embodiment of the disclosure. As shown in FIG. 8, in the exemplary serverless application deployment process 800, an end user 520 searches for a serverless application during step 810. Thus, end users 520 can browse serverless applications from the multi-cloud serverless application center, and search for specific applications in which they are interested. Thereafter, the serverless application deployment process 800 deploys the selected serverless application(s) to the appropriate one or more indicated clouds during step 820.

When developers employ the serverless application deployment process 800 to deploy serverless applications into one or more clouds in the multi-cloud environment, the SAC manager 570 finds the source code for the serverless application for the specific cloud(s) from the SAC repository 565, sends the source code for the serverless application to the multi-cloud serverless application framework 560, and the multi-cloud serverless application framework 560 deploys the source code for the serverless application into the corresponding cloud.

In one or more embodiments, end users that deploy serverless applications to a cloud, should first prepare their cloud accounts in advance. End users can be redirected to an authentication page of the cloud providers for identity check purpose using authentication mechanisms.

Figure 9:
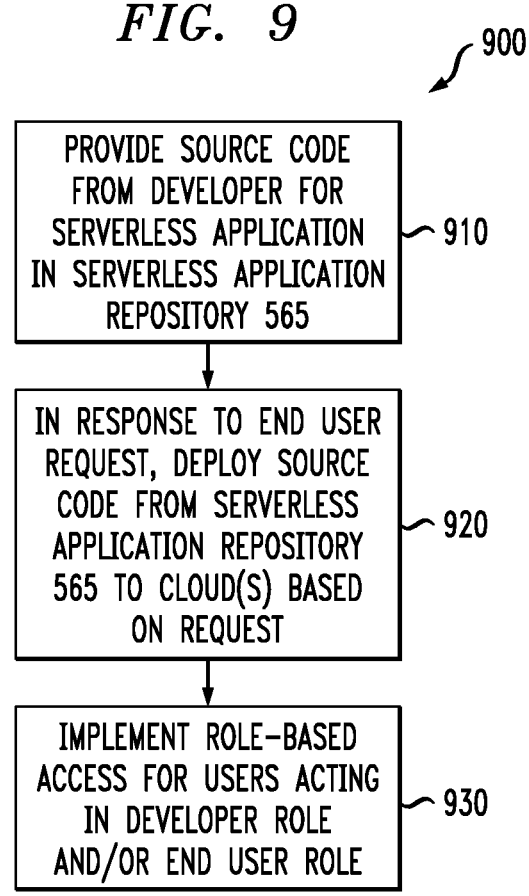
FIG. 9 is a flow chart illustrating an exemplary implementation of a multi-cloud role-based serverless application deployment process, according to one embodiment.

FIG. 9 is a flow chart illustrating an exemplary implementation of a multi-cloud role-based serverless application deployment process 900, according to one embodiment. As shown in FIG. 9, the exemplary multi-cloud role-based serverless application deployment process 900 initially provides source code, obtained during step 910 from a developer 510 user using a user interface 540, for a serverless application in the SAC repository 565. The serverless application is deployable to one or more clouds of a plurality of distinct cloud environments.

During step 920, the exemplary multi-cloud role-based serverless application deployment process 900 deploys, in response to a request from an end user 520 using the user interface 540, source code for the serverless application from the SAC repository 565 to one or more of the clouds in plurality of distinct cloud environments based on the request.

In addition, the exemplary multi-cloud role-based serverless application deployment process 900 implements role-based access for users acting in a developer role and/or an end user role, during step 930. In some embodiments, the developer 510 can only upload source code for a serverless application to the SAC repository 565. In addition, an end user 520 cannot change anything but can deploy a serverless application to a public cloud.

The disclosed multi-cloud serverless application framework 100 allows end users to deploy serverless applications into a multi-cloud environment. With existing deployment techniques, customers must build applications by themselves, which may be a limiting constraint for some customers. There are several technical requirements for customers including but not limited to, a familiarity with serverless technical background of each cloud provider, a familiarity with programming languages used to build the application, and a capability to understand and develop serverless applications.

In addition, with existing multi-cloud serverless application deployment techniques, target customers are often limited to those with experienced technical skills, while non-technical customers are not able to deploy serverless applications by utilizing this framework.

One or more aspects of the present disclosure recognize that many serverless applications, such as email servers, are general purpose applications, which could be shared and reused by multiple customers. Existing multi-cloud serverless application deployment techniques, however, only allow customers to develop and deploy their own serverless applications in such a multi-cloud environment, in the sense that applications cannot be shared between customers, which often leads to a waste of time and/or resources.

In some embodiments, by differentiating customers into developers and end users, for example, the disclosed multi-cloud serverless application framework 100 allows end users to deploy any serverless application listed in the disclosed multi-cloud serverless application center 500 to a selected cloud, and there is little, if any, technical requirements for end users 520.

In addition, one or more embodiments allow developers 510 and end users 520 to share and reuse serverless applications between each other, since the applications listed by the disclosed multi-cloud serverless application center 500 could be reused by several end users.

One or more embodiments of the disclosure provide improved methods, apparatus and computer program products for a multi-cloud serverless application center 500 for serverless applications. The foregoing applications and associated embodiments should be considered as illustrative only, and numerous other embodiments can be configured using the techniques disclosed herein, in a wide variety of different applications.

It should also be understood that the disclosed multi-cloud techniques for serverless applications, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed multi-cloud techniques for serverless applications may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-cloud serverless application center 500, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based multi-cloud operations platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
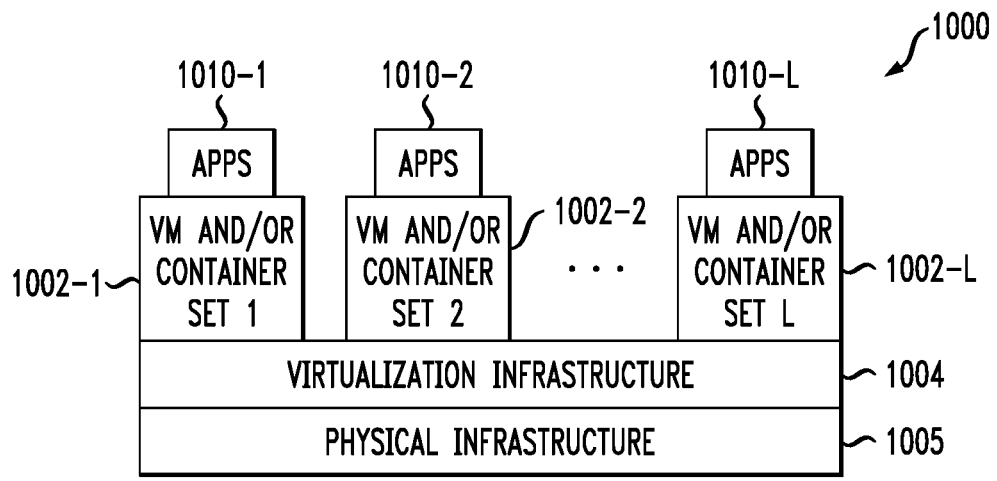
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system of the multi-cloud serverless application center 500. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide multi-cloud serverless application deployment functionality of the type described above for one or more processes running on a given one of the VMs. For example, each of the VMs can implement multi-cloud control logic and associated source code adaptation for providing multi-cloud deployment functionality for serverless applications for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide multi-cloud deployment functionality for serverless applications of the type described above for one or more processes running on different ones of the containers. For example, a container host device supporting multiple containers of one or more container sets can implement one or more instances of multi-cloud control logic and associated role-based access for providing multi-cloud deployment functionality for serverless applications.

As is apparent from the above, one or more of the processing modules or other components of the multi-cloud serverless application center 500 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
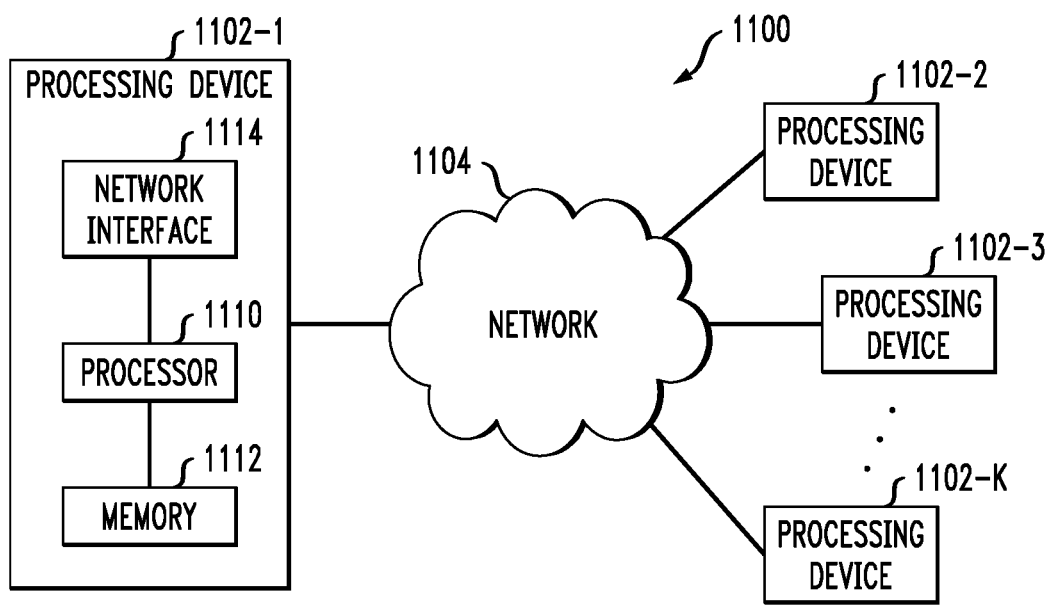
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
providing source code, obtained from a first user acting in a developer role using a first instance of a user interface, for at least a portion of a serverless application in a serverless application repository, wherein the serverless application is deployable to at least two clouds of a plurality of distinct cloud environments, the at least two clouds corresponding to at least two different cloud types, and wherein the source code comprises source code for each of the at least two different cloud types;
deploying, in response to a request from a second user acting in an end user role using a second instance of the user interface, source code for the serverless application from the serverless application repository to one or more of the clouds in the plurality of distinct cloud environments based on the request; and
implementing role-based access for users accessing the serverless application repository using the user interface acting in said developer role and said end user role,
wherein the method is performed by at least one processing device comprising a processor coupled to a memory.

2. The method of claim 1, further comprising evaluating one or more of a quality, a validity, and a compliance of the provided source code.

3. The method of claim 1, further comprising publishing the serverless application to the serverless application repository following a predefined approval evaluation.

4. The method of claim 1, wherein the request from the second user comprises a selection by the second user from a published list of serverless applications available in the serverless application repository.

5. The method of claim 1, wherein the user interface allows the second user to one or more of (i) review a published list of serverless applications available in the serverless application repository; and (ii) search a plurality of serverless applications available in the serverless application repository.

6. The method of claim 1, wherein the role-based access comprises a role-based authentication of users acting in said developer role and said end user role.

7. The method of claim 1, wherein the request from the second user specifies the one or more clouds where the serverless application is deployed.

8. A system, comprising:
a memory; and
at least one processing device, coupled to the memory, operative to implement the following steps:
providing source code, obtained from a first user acting in a developer role using a first instance of a user interface, for at least a portion of a serverless application in a serverless application repository, wherein the serverless application is deployable to at least two clouds of a plurality of distinct cloud environments, the at least two clouds corresponding to at least two different cloud types, and wherein the source code comprises source code for each of the at least two different cloud types;
deploying, in response to a request from a second user acting in an end user role using a second instance of the user interface, source code for the serverless application from the serverless application repository to one or more of the clouds in the plurality of distinct cloud environments based on the request; and
implementing role-based access for users accessing the serverless application repository using the user interface acting in said developer role and said end user role.

9. The system of claim 8, further comprising publishing the serverless application to the serverless application repository following a predefined approval evaluation.

10. The system of claim 8, wherein the request from the second user comprises a selection by the second user from a published list of serverless applications available in the serverless application repository.

11. The system of claim 8, wherein the user interface allows the second user to one or more of (i) review a published list of serverless applications available in the serverless application repository; and (ii) search a plurality of serverless applications available in the serverless application repository.

12. The system of claim 8, wherein the role-based access comprises a role-based authentication of users acting in said developer role and said end user role.

13. The system of claim 8, wherein the request from the second user specifies the one or more clouds where the serverless application is deployed.

14. A computer program product, comprising a tangible machine-readable storage medium having encoded therein executable code of one or more software programs, wherein the one or more software programs when executed by at least one processing device perform the following steps:
providing source code, obtained from a first user acting in a developer role using a first instance of a user interface, for at least a portion of a serverless application in a serverless application repository, wherein the serverless application is deployable to at least two clouds of a plurality of distinct cloud environments, the at least two clouds corresponding to at least two different cloud types, and wherein the source code comprises source code for each of the at least two different cloud types;
deploying, in response to a request from a second user acting in an end user role using a second instance of the user interface, source code for the serverless application from the serverless application repository to one or more of the clouds in the plurality of distinct cloud environments based on the request; and
implementing role-based access for users accessing the serverless application repository using the user interface acting in said developer role and said end user role.

15. The computer program product of claim 14, further comprising evaluating one or more of a quality, a validity, and a compliance of the provided source code.

16. The computer program product of claim 14, further comprising publishing the serverless application to the serverless application repository following a predefined approval evaluation.

17. The computer program product of claim 14, wherein the request from the second user comprises a selection by the second user from a published list of serverless applications available in the serverless application repository.

18. The computer program product of claim 14, wherein the user interface allows the second user to one or more of (i) review a published list of serverless applications available in the serverless application repository; and (ii) search a plurality of serverless applications available in the serverless application repository.

19. The computer program product of claim 14, wherein the role-based access comprises a role-based authentication of users acting in said developer role and said end user role.

20. The computer program product of claim 14, wherein the request from the second user specifies the one or more clouds where the serverless application is deployed.

\* \* \* \* \*

UNITED STATES PATENT AND TRADEMARK OFFICE
CERTIFICATE OF CORRECTION

PATENT NO. : 11,533,317 B2
APPLICATION NO. : 16/587716
DATED : December 20, 2022
INVENTOR(S) : Ruixue Zhang et al.

It is certified that error appears in the above-identified patent and that said Letters Patent is hereby corrected as shown below:

In the Claims

Column 16, Lines 42-43, the portion of Claim 14 reading "comprising a tangible machine-readable storage medium", should read --comprising a non-transitory machine-readable storage medium--.

Signed and Sealed this
Twenty-first Day of February, 2023

Katherine Kelly Vidal
*Director of the United States Patent and Trademark Office*